US010185381B2

(12) United States Patent
Wu et al.

(10) Patent No.: US 10,185,381 B2
(45) Date of Patent: Jan. 22, 2019

(54) SYSTEM FOR SYNCHRONOUS RECTIFIER VOLTAGE REGULATOR SHOOT-THROUGH DETECTION

(71) Applicant: DELL PRODUCTS, LP, Round Rock, TX (US)

(72) Inventors: Feng-Yu (Wickman) Wu, Taipei (TW); Terence Rodrigues, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 216 days.

(21) Appl. No.: 15/178,844

(22) Filed: Jun. 10, 2016

(65) Prior Publication Data
US 2017/0357309 A1    Dec. 14, 2017

(51) Int. Cl.
| | |
|---|---|
| *G06F 1/28* | (2006.01) |
| *G06F 1/26* | (2006.01) |
| *G06F 1/32* | (2006.01) |

(52) U.S. Cl.
CPC .......... *G06F 1/28* (2013.01); *G06F 1/26* (2013.01); *G06F 1/3225* (2013.01); *G06F 1/3296* (2013.01)

(58) Field of Classification Search
CPC ........ G06F 1/3296; G06F 1/3225; G06F 1/28; G06F 1/26
See application file for complete search history.

(56) References Cited

U.S. PATENT DOCUMENTS

| | | | | |
|---|---|---|---|---|
| 6,147,545 A | * | 11/2000 | Marshall ............ | H03K 17/0822 326/28 |
| 6,597,157 B1 | * | 7/2003 | Boeckmann ............ | G05F 1/618 323/242 |
| 2006/0256589 A1 | * | 11/2006 | Choi ....................... | H02M 1/38 363/56.04 |
| 2006/0275970 A1 | * | 12/2006 | Nadd ................... | H02H 7/0838 438/197 |
| 2012/0032657 A1 | | 2/2012 | Dequina | |
| 2012/0212861 A1 | * | 8/2012 | Menegoli ............... | H02H 9/001 361/18 |

(Continued)

OTHER PUBLICATIONS

"Limiting Cross-Conduction Current in Synchronous Buck Converter Designs," Elbanhawy, Alan, AN-7019, Fairchild Semiconductor, Rev. A Sep. 30, 2005, pp. 1-7.

(Continued)

*Primary Examiner* — Jaweed A Abbaszadeh
*Assistant Examiner* — Gayathri Sampath
(74) *Attorney, Agent, or Firm* — Larson Newman, LLP

(57) ABSTRACT

A method, circuit, and information handling system detect an assertion of a low side gate driver signal of a low side gate driver coupled to a low side gate of a low side selectively conductive device, to obtain a reference voltage value, to detect a local high side positive supply voltage at a high side positive supply voltage terminal of a high side selectively conductive device, to compare the local high side positive supply voltage to the reference voltage value to provide an indication of a cross-conduction detection, and to provide a warning of the cross-conduction detection before occurrence of a failure of a selectively conductive device selected from a group consisting of the low side selectively conductive device and the high side selectively conductive device.

17 Claims, 6 Drawing Sheets

(56) References Cited

U.S. PATENT DOCUMENTS

2015/0123710 A1* 5/2015 Gupta ..................... H03K 5/15
327/23

OTHER PUBLICATIONS

"Shoot-through' in Synchronous Buck Converters," Jon Klein, AN-6003, Power Management Applications, Fairchild Semiconductor, Apr. 25, 2003, pp. 1-6.
"MOSFET Susceptibility to Cross Conduction," Elbanhawy, Alan, Fairchild, Power Electronics Technology, Semiconductor, Apr. 2005, pp. 26-33.

* cited by examiner

SYSTEM FOR SYNCHRONOUS RECTIFIER VOLTAGE REGULATOR SHOOT-THROUGH DETECTION

FIELD OF THE DISCLOSURE

The present disclosure generally relates to information handling systems, and more particularly relates to synchronous rectifier voltage regulator shoot-through detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method, circuit, and information handling system detect an assertion of a low side gate driver signal of a low side gate driver coupled to a low side gate of a low side selectively conductive device, to obtain a reference voltage value, to detect a local high side positive supply voltage at a high side positive supply voltage terminal of a high side selectively conductive device, to compare the local high side positive supply voltage to the reference voltage value to provide an indication of a cross-conduction detection, and to provide a warning of the cross-conduction detection before occurrence of a failure of a selectively conductive device selected from a group consisting of the low side selectively conductive device and the high side selectively conductive device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
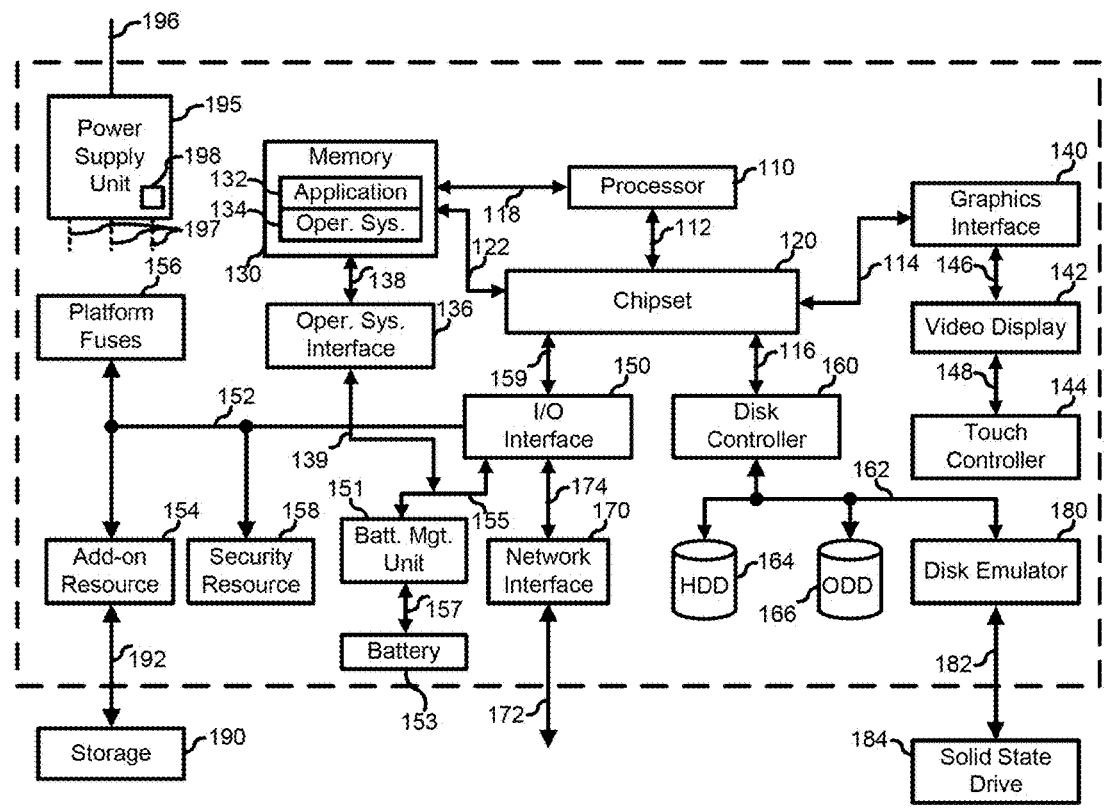
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system typically requires power to operate. Such power may be supplied by a power supply unit (PSU). A circuit, such as a PSU circuit, may transfer power by switching a node between different voltages. Some circuits include at least two selectively conductive devices configured in series to selectively couple different voltages to an output node at a common point between the two selectively conductive devices. As it may be desirable for the output node to be coupled to one or another of the different voltages, but not both, simultaneous conduction of the at least two selectively conductive devices can be problematic. Such simultaneous conduction of the at least two selectively conductive devices may be referred to as cross-conduction, or "shoot through." The severity of the problem can be exacerbated by a low impedance nature of the at least two selectively conductive devices, allowing a large amount of undesired current flow. In some cases, the amount of undesired current flow can be large enough to damage or destroy at least one of the at least two selectively conductive devices, rendering the circuits unusable.

The "shoot through" phenomenon can occur in, for example, voltage regulators (VRs) for power supplies, such as information handling system power supplies. Such voltage regulators may use, for example, metal oxide semiconductor field effect transistors (MOSFETs) as their selectively conductive devices. When shoot-through events occur, they not only can destroy the switching MOSFETs, but also can cause extensive damage to central processing units (CPUs) and chipsets which form the output load of the voltage regulator modules (VRMs). The problem is expected to become much worse in the future as the switching frequency of VRs keeps on increasing. There is therefore a need to be able to detect when shoot-through events occur, in order to take remedial action before any components can be damaged, as well as to perform predictive failure analysis.

In order to improve the efficiency of VRs, a free-wheeling diode in the switching converter is often replaced by a controlled switch in the form of a synchronous low-side (e.g., side toward a more negative supply voltage) MOSFET. Under normal operation, only one of the low-side MOSFET and a high-side (e.g., side toward a more positive supply voltage) MOSFET is allowed to be on at a time. If for some reason, both the high-side and low-side MOSFET are in a conducting state (either fully or partially), a cross-conduction, or "shoot-through," event is said to have occurred. During the shoot-through event, a dead short circuit is effectively created between the supply voltage and ground leading to large currents being drawn from the input power supply unit (PSU).

There are several potential causes of a shoot-through event in a VR. One example is an improper printed circuit board (PCB) layout of the MOSFET driver, which can cause noise from the ground to be coupled into the MOSFET driver internal circuits resulting in a malfunction. Another example is that, because of the requirements of small size, aggressive compensation networks having a wide bandwidth are used. The wide bandwidth allows high frequency noise to be easily injected into the VR control loop, causing glitches to be observed in the pulse width modulated (PWM) outputs. As yet another example, as MOSFET drivers become more complex, the propagation delay of internal logic paths cannot be tightly controlled because of large process variations in power-semiconductor material. Variations of propagation delays along different internal logic paths can result in glitches in or overlap between MOSFET drive signals, leading to undesired simultaneous conduction of multiple selectively conductive devices, such as MOSFETs. As a further example, in an effort to reduce switching losses in the high side MOSFET, its turn-on and turn-off transition times may be reduced. However the faster the high-side MOSFET is turned on, the more susceptible the low side MOSFET becomes to changing voltage per unit time (dv/dt) induced turn on (e.g., induced from the switching node to the gate node of the low side MOSFET). The low-side MOSFET is thus forced on even though the gate drive signal commands it to be turned off. One example of a voltage regulator circuit that can be adversely affected by the shoot-through phenomenon is a multi-phase synchronous rectifier voltage regulator circuit.

One approach to detecting shoot-through events involves sampling the high-side driver gate signal (HG) and the low-side driver gate signal (LG). If both are detected asserted at the same time, a shoot-through event is signaled. These methods suffer from the problem of false-positive detection. For example, a shoot-through event can be indicated even though it may not actually have taken place. With varied gate drive strengths, different MOSFET gate capacitances, and a relatively long dead-time interval (e.g., 10-20 ns), a detected shoot-through event may not actually have taken place, even if both HG and LG are detected asserted during the dead-time.

Another approach is based upon sampling the phase node (Vph) at the junction of the high-side and low-side MOSFETs. $Vph=Vin*(RdsLow)/(RdsLow+RdsHigh)$. As seen from this equation, Vph depends upon RdsLow and RdsHigh (the drain-to-source resistance of low side and high side MOSFETs, respectively), which are not uniform and definite. This makes the method particularly prone to mis-triggering during light-load conditions. Thus, existing techniques for attempting to detect shoot-through events exhibit deficiencies that can impair their usefulness.

FIG. 1 shows a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, include an operating system interface 136, a disk controller 160, a disk emulator 180, an input/output (I/O) interface 150, and a network interface 170. Processor 110 is connected to chipset 120 via processor interface 112. Processor 110 is connected to memory 130 via a memory bus 118. Memory 130 is connected to chipset 120 via a memory bus 122. Memory 130 comprises memory storing an application 132 and memory storing an operating system 134. Memory 130 is connected to operating system interface 136 by operating system interface connection 138. Operating system interface 136 is connected to a connection 155 between I/O interface 150 and battery management unit 151 by connection 139. Battery management unit 151 is connected to battery 153 via battery connection 157. Graphics interface 140 is connected to chipset 120 via a graphics interface 114, and provides a video display output 146 to a video display 142. Video display 142 is connected to a touch controller 144 via touch controller connection 148. An example of memory 130 includes random access memory (RAM) such as static RAM (SRAM), dynamic RAM (DRAM), non-volatile RAM (NV-RAM), or the like, read only memory (ROM), another type of memory, or a combination thereof.

Disk controller 160 is connected to chipset 120 via disk controller interface 116. I/O interface 150 is connected to chipset 120 via an I/O channel 159. An example of I/O channel 166 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 162 includes a USB interface, an IEEE 1194 (Firewire) interface, a proprietary interface, or a combination thereof. Alternatively, solid-state drive 184 can be disposed within information handling system 100.

I/O interface 150 is connected to a network interface 170 via connection 174. Network interface 170 connects to a network via network connection 172. I/O interface 150 includes a peripheral interface 152 that connects the I/O interface to an add-on resource 154, to a security resource 158, and to platform fuses 156. Add-on resource 154 can connect to, for example, external storage 190 via external connection 192. Peripheral interface 152 can be the same type of interface as I/O channel 159, or can be a different type of interface. As such, I/O interface 170 extends the capacity of I/O channel 159 when peripheral interface 152 and the I/O channel are of the same type, and the I/O interface translates information from a format suitable to the I/O channel to a format suitable to the peripheral channel 152 when they are of a different type. Add-on resource 154 can include a data storage system, an additional graphics interface, a network interface card (NIC), a sound/video processing card, another add-on resource, or a combination thereof. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 110, in another suitable location, or a combination thereof. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channel 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Power supply unit (PSU) 195 provides power to other elements of information handling system 100. PSU 195 receives a power input 196 and provides power outputs 197. PSU 195 comprises a voltage regulator (VR) circuit 198, which may include selectively conductive devices configured in series between different voltages, as will be discussed below in more detail with respect to other FIGs.

Figure 2:
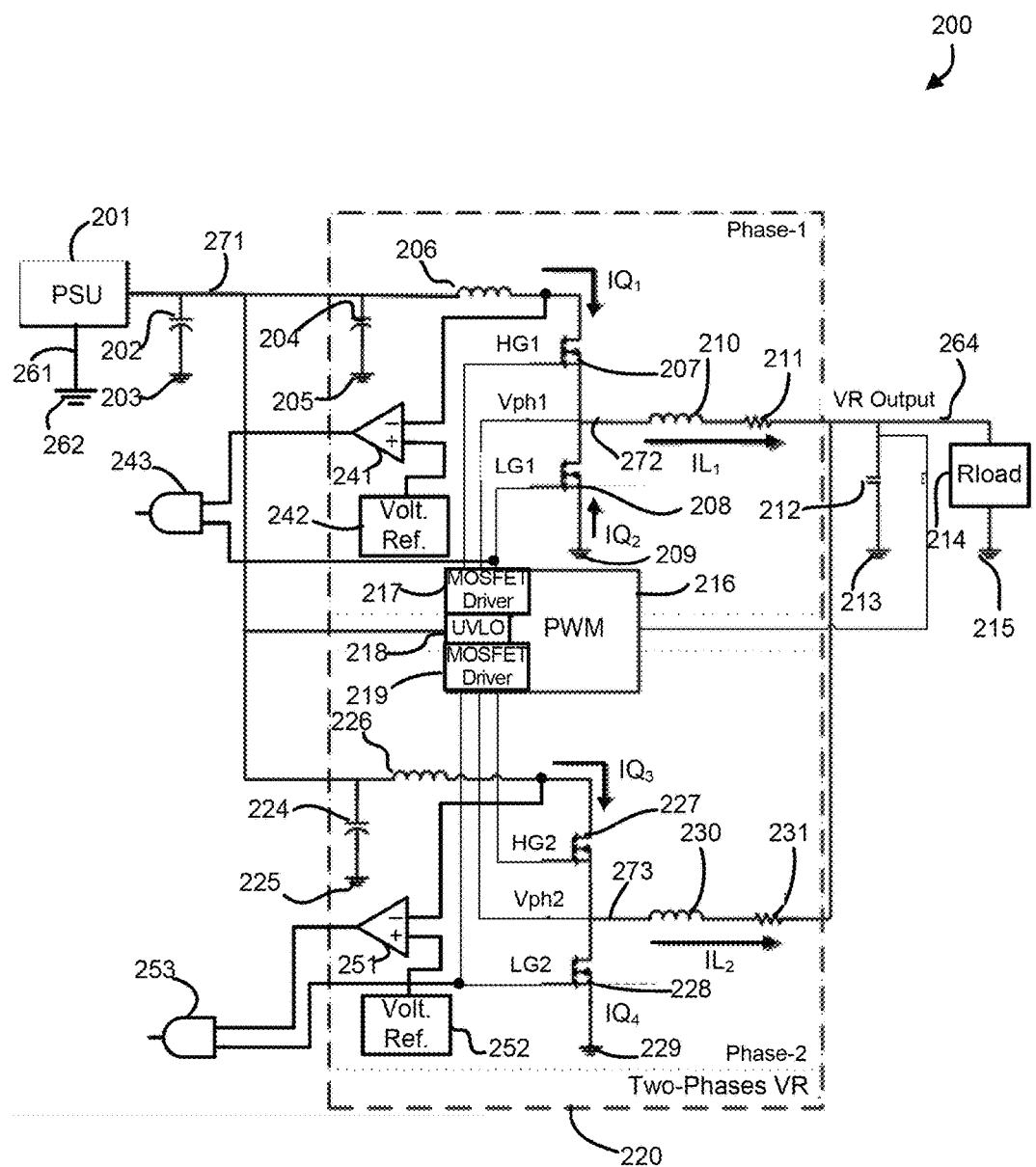
FIG. 2 is a schematic diagram illustrating a circuit according to an embodiment of the present disclosure.

FIG. 2 is a schematic diagram illustrating a circuit according to an embodiment of the present disclosure. Circuit 200 comprises a power supply unit (PSU) 201, a voltage regulator (VR) 220, and an electrical load 214. VR 220 comprises a first phase portion and a second phase portion. PSU 201 is connected to ground 262 at node 261 and has a PSU output for providing a power supply voltage referenced to ground at node 271. Node 271 is connected to a first terminal of capacitor 202. A second terminal of capacitor 202 is connected to ground 203. Node 271 is connected to a first terminal of capacitor 204. A second terminal of capacitor 204 is connected to ground 205. Node 271 is connected to a first terminal of capacitor 224. A second terminal of capacitor 224 is connected to ground 225. Node 271 is connected to an input of an undervoltage lockout (UVLO) circuit 218 of pulse width modulation (PWM) circuit 216. Node 271 is connected to a first terminal of inductor 206. Node 271 is connected to a first terminal of inductor 226. Inductor 226 can, for example, be a parasitic inductor, which need not be implemented as a manufactured component installed on a circuit board but may result from the inductance of a practical conductive path established to provide power to a component that receives its power from PSU 201.

A second terminal of inductor 206 is connected to an inverting input of comparator 241 and to a first terminal of metal oxide semiconductor field effect transistor (MOSFET) 207. A MOSFET driver circuit 217 of PWM circuit 216 is connected to a gate terminal of MOSFET 207. A second terminal of MOSFET 207 is connected to a first phase voltage node 272. The first phase voltage node 272 is connected to an input of MOSFET driver 217, to a first terminal of MOSFET 208, and to a first terminal of inductor 210. A second terminal of inductor 210 is connected to a first terminal of resistor 211. A second terminal of resistor 211 is connected to a VR output node 264. VR output node 264 is connected to a first terminal of capacitor 212. A second terminal of capacitor 212 is connected to ground 213. VR output node 264 is connected to an input of PWM circuit 216. VR output node 264 is connected to a first terminal of electrical load 214. A second terminal of electrical load 214 is connected to ground 215.

A reference voltage output of voltage reference 242 is connected to a non-inverting input of comparator 241. The voltage reference 242 comprises a steady state voltage reference providing a reference voltage value that remains constant throughout a cross-conduction event. An output of comparator 241 is connected to a first input of logic gate 243. A second terminal of MOSFET 208 is connected to ground 209. MOSFET driver circuit 217 of PWM circuit 216 is connected to a gate terminal of MOSFET 208 and to a second input of logic gate 243. Logic gate 243 provides a shoot-through detection output.

A second terminal of inductor 226 is connected to an inverting input of comparator 251 and to a first terminal of metal oxide semiconductor field effect transistor (MOSFET) 227. A MOSFET driver circuit 219 of PWM circuit 216 is connected to a gate terminal of MOSFET 227. A second terminal of MOSFET 227 is connected to a first phase voltage node 273. The first phase voltage node 273 is connected to an input of MOSFET driver 227, to a first terminal of MOSFET 228, and to a first terminal of inductor 230. A second terminal of inductor 230 is connected to a first terminal of resistor 231. A second terminal of resistor 231 is connected to a VR output node 264.

A reference voltage output of voltage reference 252 is connected to a non-inverting input of comparator 251. An output of comparator 251 is connected to a first input of logic gate 253. A second terminal of MOSFET 228 is connected to ground 229. MOSFET driver circuit 219 of PWM circuit 216 is connected to a gate terminal of MOSFET 228 and to a second input of logic gate 253. Logic gate 253 provides a shoot-through detection output.

MOSFET 207 is an example of a first selectively conductive device, the first selectively conductive device having a first control terminal, a first supply voltage terminal, and a first output terminal. Inductor 206 can be a parasitic inductor having a first parasitic inductor terminal coupled to the PSU output and a second parasitic inductor terminal coupled to the first supply voltage terminal of the first selectively conductive device. MOSFET 208 is an example of a second selectively conductive device, the second selectively conductive device having a second control terminal, a second supply voltage terminal, and a second output terminal, the second output terminal coupled to the first output terminal. Voltage reference 242 is used for obtaining a reference voltage value, which is provided to comparator 241. Comparator 241 has a first comparator input coupled to the voltage reference and a second comparator input coupled to the first supply voltage terminal of the first selectively conductive device. Comparator 241 can detect a momentary reduction of a local power supply voltage at the first power supply voltage terminal of the first selectively conductive device relative to the reference voltage value. Comparator 241 can detect a local power supply voltage drop during a cross-conduction event and the logic gate validates the power supply voltage drop as being caused by the cross-conduction event, the cross-conduction event occurring upon simultaneous conduction of the first selectively conductive device and the second selectively conductive device. Comparator 241 has a comparator output for providing a comparator output signal to an input of logic gate 243.

Logic gate 243 has a first logic gate input coupled to the comparator output and a second logic gate input coupled to the second control terminal. Logic gate 243 has a logic gate output for providing a logic gate output signal. As an example, logic gate 243 can implement an AND logical function to condition detection of a momentary reduction of a local power supply voltage at the first power supply voltage terminal of the first selectively conductive device relative to the reference voltage value upon a condition that a control drive signal provided to the second control terminal is asserted.

Figure 3:
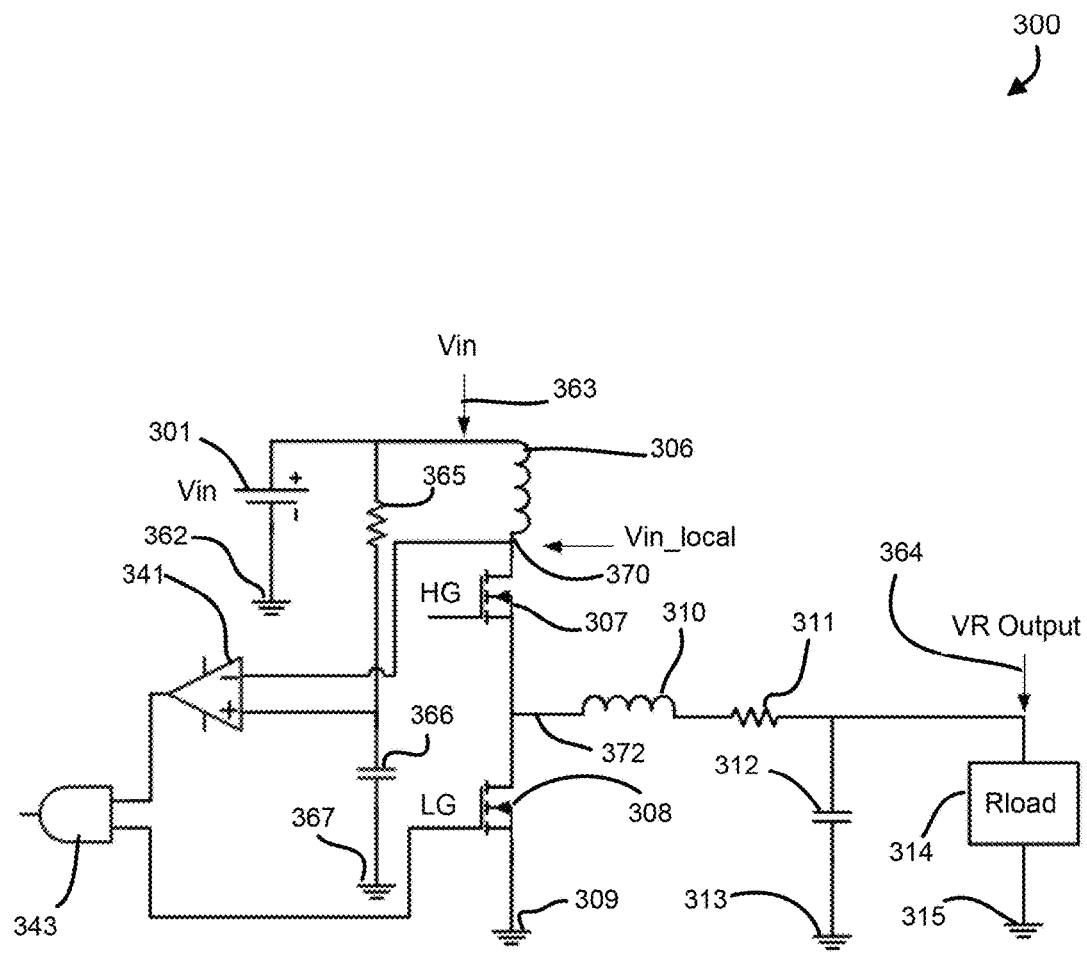
FIG. 3 is a schematic diagram illustrating a circuit according to an embodiment of the present disclosure.

FIG. 3 shows a circuit according to an embodiment of the present disclosure. Circuit 300 includes a power supply unit (PSU) 301, a voltage regulator (VR) circuit, and an electrical load 314. The VR circuit includes a first phase portion. Additional numbers of phase portions may be implemented as desired in a manner similar to that of the first phase portion. PSU 301 is connected to ground 362 and provides an output voltage referenced to ground 362. An output of PSU 301 at node 363 is connected to a first terminal of inductor 306 and to a first terminal of resistor 365. A second terminal of resistor 365 is connected to a non-inverting input of comparator 341 and to a first terminal of capacitor 366. A second terminal of capacitor 366 is connected to ground 367. The second terminal of capacitor 366 may be coupled to any stable voltage source, such as ground or another voltage source that remains stable at a constant voltage through a cross-conduction event. An output of comparator 341 is connected to a first terminal of logic gate 343. As an example, logic gate 343 may be an AND gate.

A second terminal of inductor 306 is connected to a local supply voltage node 370, which is connected to a first terminal of MOSFET 307 and to an inverting input of comparator 341. A second terminal of MOSFET 307 is connected to a first terminal of inductor 310 and to a first terminal of MOSFET 308 at node 372. A second terminal of MOSFET 308 is connected to ground 309, which is a negative supply voltage relative to the positive supply voltage at node 363. A high side control circuit is connected to the gate terminal of MOSFET 307 to control MOSFET 307. A low side control circuit is connected to the gate terminal of MOSFET 308 to control MOSFET 308. The gate terminal of MOSFET 308 is connected to a second input of logic gate 343. Logic gate 343 provides a shoot-through detection output.

The second terminal of inductor 310 is connected to a first terminal of resistor 311. A second terminal of resistor 311 is connected to a first terminal of capacitor 312 and to a first terminal of electrical load 314 at voltage regulator output node 364. A second terminal of capacitor 312 is connected to ground 313. A second terminal of electrical load 314 is connected to ground 315.

Figure 4:
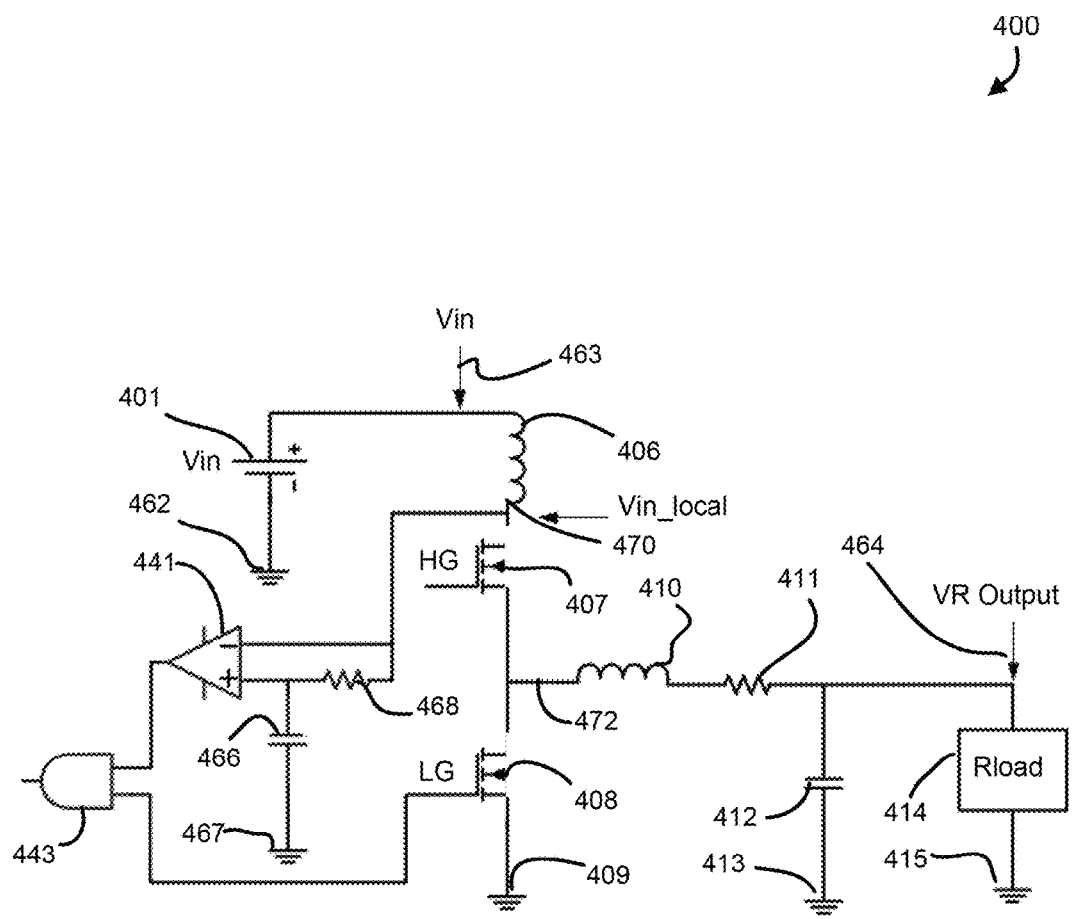
FIG. 4 is a schematic diagram illustrating a circuit according to an embodiment of the present disclosure.

FIG. 4 is a schematic diagram illustrating a circuit according to an embodiment of the present disclosure. Circuit 400 comprises a power supply unit (PSU) 401, a voltage regulator (VR) circuit, and an electrical load 414. The VR circuit comprises a first phase portion. Additional numbers of phase portions may be implemented as desired in a manner similar to that of the first phase portion. PSU 401 is connected to ground 462 and provides an output voltage referenced to ground 462. An output of PSU 401 at node 463 is connected to a first terminal of inductor 406. A second terminal of inductor 406 is connected to a local supply voltage node 470, which is connected to a first terminal of MOSFET 407, to an inverting input of comparator 441, and to a first terminal of resistor 468. A second terminal of resistor 468 is connected to a non-inverting input of comparator 441 and to first terminal of capacitor 466. A second terminal of capacitor 466 is connected to ground 467. The second terminal of capacitor 467 may be coupled to any stable voltage source, such as ground or another voltage source that remains stable at a constant voltage through a cross-conduction event. An output of comparator 441 is connected to a first terminal of logic gate 443. As an example, logic gate 443 may be an AND gate.

A second terminal of MOSFET 407 is connected to a first terminal of inductor 410 and to a first terminal of MOSFET 408 at node 472. A second terminal of MOSFET 408 is connected to ground 409, which is a negative supply voltage relative to the positive supply voltage at node 463. A high side control circuit is connected to the gate terminal of MOSFET 407 to control MOSFET 407. A low side control circuit is connected to the gate terminal of MOSFET 408 to control MOSFET 408. The gate terminal of MOSFET 408 is connected to a second input of logic gate 443. Logic gate 443 provides a shoot-through detection output.

The second terminal of inductor 410 is connected to a first terminal of resistor 411. A second terminal of resistor 411 is connected to a first terminal of capacitor 412 and to a first terminal of electrical load 414 at voltage regulator output node 464. A second terminal of capacitor 412 is connected to ground 413. A second terminal of electrical load 414 is connected to ground 415.

Figure 5:
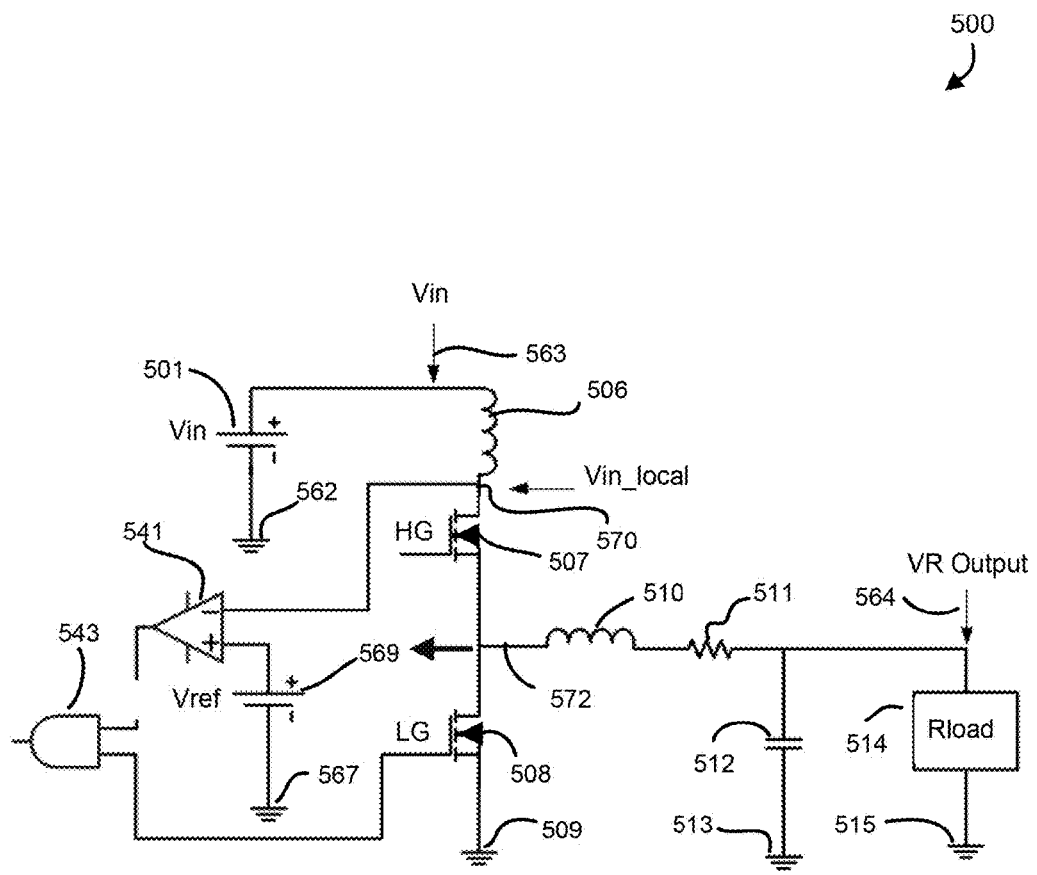
FIG. 5 is a schematic diagram illustrating a circuit according to an embodiment of the present disclosure.

FIG. 5 shows a circuit according to an embodiment of the present disclosure. Circuit 500 includes a power supply unit (PSU) 501, a voltage regulator (VR) circuit, and an electrical load 514. The VR circuit includes a first phase portion. Additional numbers of phase portions may be implemented as desired in a manner similar to that of the first phase portion. PSU 501 is connected to ground 562 and provides an output voltage referenced to ground 562. An output of PSU 501 at node 563 is connected to a first terminal of inductor 506. A positive output of reference voltage source 569 is connected to a non-inverting input of comparator 541. A negative output of reference voltage source 569 is connected to ground 567. An output of comparator 541 is connected to a first terminal of logic gate 543. As an example, logic gate 543 may be an AND gate.

A second terminal of inductor 506 is connected to a local supply voltage node 570, which is connected to a first terminal of MOSFET 507 and to an inverting input of comparator 541. A second terminal of MOSFET 507 is connected to a first terminal of inductor 510 and to a first terminal of MOSFET 508 at node 572. A second terminal of MOSFET 508 is connected to ground 509, which is a negative supply voltage relative to the positive supply voltage at node 563. A high side control circuit is connected to the gate terminal of MOSFET 507 to control MOSFET 507. A low side control circuit is connected to the gate terminal of MOSFET 508 to control MOSFET 508. The gate terminal of MOSFET 508 is connected to a second input of logic gate 543. Logic gate 543 provides a shoot-through detection output.

The second terminal of inductor 510 is connected to a first terminal of resistor 511. A second terminal of resistor 511 is connected to a first terminal of capacitor 512 and to a first terminal of electrical load 514 at voltage regulator output node 564. A second terminal of capacitor 512 is connected to ground 513. A second terminal of electrical load 514 is connected to ground 515.

Figure 6:
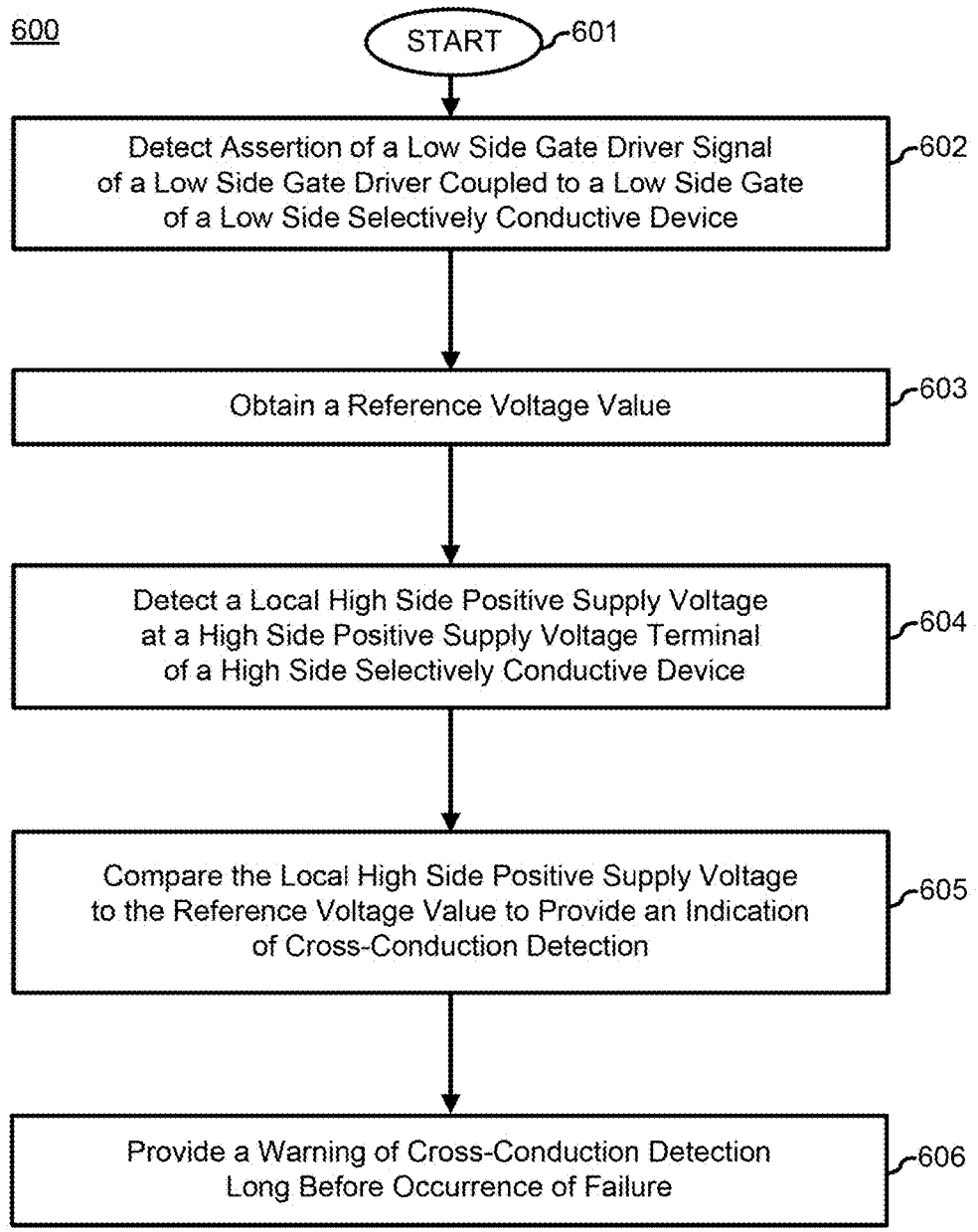
FIG. 6 is a flow diagram illustrating a method according to an embodiment of the present disclosure.

FIG. 6 is a flow diagram illustrating a method according to an embodiment of the present disclosure. Method 600 begins at block 601 and continues to block 602. At block 602, assertion of a low side gate driver signal of a low side gate driver coupled to a low side gate of a low side selectively conductive device is detected. The assertion of the low side gate driver signal can be used, for example, as a condition precedent to performing other blocks, such as blocks 603 to 606. Accordingly, immunity in the detection of a cross-conduction occurrence to dynamic phenomena that may affect the perceived timing of the assertion of the low side gate driver signal is provided. From block 602, method 600 continues to block 603. At block 603, a reference voltage value is obtained. The reference voltage can be obtained, for example, from a fixed reference voltage source, from a steady-state value of a supply voltage, such as a positive supply voltage, or from a steady-state value of a local high side positive supply voltage. Steady-state values of voltages can be obtained by using a resistor-capacitor (RC) circuit to low-pass filter (LPF) a voltage that may change, for example, during a cross-conduction event. For example, a capacitor may be charged to a steady-state voltage corresponding to the steady-state value through a resistor coupled to a node where a possibly unsteady voltage may exist. As the local high side positive supply voltage may have a steady-state value substantially equal to a steady-state value of the positive supply voltage to which it is connected, and an reference voltage source may be selected to have a voltage substantially equal to the steady-state value of the positive supply voltage, a suitable reference voltage value may be obtained in any of a variety of ways, as discussed above. From block 603, method 600 continues to block 604.

At block 604, a local high side positive supply voltage at a high side positive supply voltage terminal of a high side selectively conductive device is detected. Because of parasitic impedance, such as parasitic resistance and parasitic inductance, that may exist between the positive supply voltage and the local high side positive supply voltage existing at the high side positive supply voltage terminal of the high side selectively conductive device, high current flow through the high side selectively conductive device, such as the high current flow that occurs during a cross-conduction event, can cause the local high side positive supply voltage to dip momentarily below the positive supply voltage. From block 604, method 600 continues to block 605. At block 605, the local high side positive supply voltage is compared to the reference voltage value to provide an indication of cross-conduction detection. If the comparison shows the local high side positive supply voltage to be lower than the reference voltage value, such as a reference voltage value representative of a steady state high side positive supply voltage, while the low side gate driver signal is asserted, it is concluded that a cross-conduction event is occurring. Checking that the low side gate driver signal is asserted can avoid a false indication based on voltage drop across the parasitic impedance between the high side positive supply voltage and the local high side positive supply voltage at the high side positive supply voltage terminal of the high side selectively conductive device when the high side selectively conductive device is conducting but the low side selectively conductive device is not conducting. From block 605, method 600 continues to block 606.

At block 606, a warning of cross-conduction detection is provided long before occurrence of failure. As system failure may occur after many (e.g., hundreds of) cross-conduction events, which may occur relatively infrequently, a warning of cross-conduction detection can provide, for example, hours or days of advance warning of impending failure.

A cross-conduction, or shoot-through, detection circuit, system, and method is provided. Shoot-through detection may be provided for series-connected selectively conductive devices, such as switching devices in a voltage regulator circuit, for example, a synchronous rectifier voltage regulator circuit.

Referring back to FIG. 5, under normal operating conditions with no shoot-through, when the low-side MOSFET 580 is turning on, Vin_local at node 570 will momentarily rise above the supply voltage (Vin). This occurs because, as the high-side MOSFET is turning off, per Lenz's law, the electromotive force (EMF) induced in the leakage inductance (L_leakage) shown as inductor 506 will cause the potential of Vin_local at node 570 to rise above positive supply voltage Vin of node 563. When a shoot-through condition occurs, both the high-side and low-side MOSFETs are conducting and Vin_local is seen to momentarily collapse below Vin. The circuit of FIG. 5 functions to detect that the low-side gate drive signal (LG) is asserted while the high-side MOSFETs node voltage (Vin_local) is below the supply voltage (Vin).

The shoot-through effect can be seen in a shoot-through waveform as Vin_local drooping when LG is asserted. Deficiencies of existing techniques can be avoided according to at least one embodiment as disclosed herein. By effectively detecting and responding to shoot-through situations, component damage and system failure can be avoided.

Detecting a shoot-through event by monitoring when the voltage at the high-side MOSFET drain momentarily dips below the supply voltage and the low side MOSFET gate drive is asserted. To determine if the low side gate driver (LG) signal is asserted, it is not necessary for the shoot-through detection circuit to sense the actual internal gate voltage at the gate electrode of the low side MOSFET, which may differ from the voltage at the low side driver circuit, for example, if the MOSFET has a high internal gate resistance Rg. Rather, even though the voltage at the low side driver circuit could be far different from the actual internal gate voltage at the gate electrode of the low side MOSFET, the low side gate driver (LG) signal is a logic level signal internal to the driver, which need not conform to the actual power-level signal applied to the gate of the MOSFET. The sufficiency of the logic level LG signal regardless of its idealistic character arises from the shoot-through detection circuit's use of the logic level LG signal to arm the trigger for detecting a shoot-through event and to get the detection circuit ready to detect the dip in Vsupply when it occurs later. By using the actual dip in Vsupply as the definitive indicator that shoot-through has taken place, the difficulty of accurately monitoring the internal gate voltage of the MOSFET is a moot point, yet false positive results for shoot-through detection can be avoided.

The threshold voltage of the comparator, as may be determined, for example, by a reference voltage value provided to the comparator, need not be exactly equal to a steady state high side positive supply voltage. Rather, a threshold voltage value of, for example, ninety percent of the steady state high side positive supply voltage may be used. Such a value can maintain proper operation and cross-conduction detection even with usual 10% variations that can occur with the supply voltage. In one example of actual lab measurements with Vsupply=12V, the observable voltage drop across a parasitic impedance between a high side positive supply voltage and a local high side positive supply voltage at the high side positive supply voltage terminal of the high side selectively conductive device is found to be about 2.0-2.5V. The 10% variation in 12V would be about 1.2V, so a threshold voltage value of 10% less than the supply voltage is still sufficient to allow detection of the observable voltage drop.

As the damage to a device, such as a MOSFET, depends upon the energy being dissipated in an event, such as a cross-conduction event. Thus, a single shoot-through event of short time duration (e.g., <100 ns) would not by itself be expected to destroy the MOSFET. Rather, the MOSFET continues to operate even after the shoot-through event. However, after multiple (e.g., usually >200) shoot-through events have taken place, the MOSFET does eventually get damaged. As an example, in testing, an elapsed time of 2-3 days has been observed to pass before the MOSFET finally failed. Accordingly, early detection of cross-conduction occurrences can provide ample warning to a customer that a potential MOSFET failure is about to occur, allowing steps to be taken to mitigate risks and consequences, such as by obtaining and installing a replacement PSU in the affected information handling system.

In accordance with at least one embodiment, detection of one or more cross-conduction events can be used to trigger specific mitigation measures, such as swapping out the cross-conducting VR module for a spare VR module, adjusting the timing of the high side driver or the low side driver, such as a MOSFET gate driver circuit, or swapping out an information handling system, such as a server, for a backup server to prevent the further occurrence of cross-conduction events. To implement the timing adjustment, referring back to FIG. 2, for example, the output of logic gate 243 can be provided to MOSFET driver 217, MOSFET driver 219, or both to adjust the timing of the gate drive output of either or both. The adjustment may be, for example, incremental to a new slightly adjusted timing value or, as another example, a single adjustment to a "safe harbor" timing value expected to prevent any further cross-conduction events at the possible expense of lower performance, such as lower efficiency or lower PSU power output capability. Swapping out a VR module experiencing a cross-conduction event for a spare VR module can be performed by switching of the inputs and outputs of the VR modules using switching devices, such as MOSFETs.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
obtaining a reference voltage value, wherein the reference voltage value is provided by a voltage reference circuit comprising a resistor having a first resistor terminal and a second resistor terminal, the first resistor terminal coupled to a power supply unit (PSU) output, the voltage reference circuit further comprising a capacitor having a first capacitor terminal and a second capacitor terminal, the first capacitor terminal coupled to the second resistor terminal and to the first comparator input, the second capacitor terminal coupled to a stable voltage source;
detecting a local first supply voltage at a first supply voltage terminal of a first selectively conductive device, the first selectively conductive device having a first control terminal, a first output terminal, and the first supply voltage terminal;
comparing the local first supply voltage to the reference voltage value to provide an indication of a cross-conduction detection;
detecting an assertion of a control drive signal of a control terminal driver coupled to a second control terminal of a second selectively conductive device, the second selectively conductive device having a second supply voltage terminal, a second output terminal, and the second control terminal; and
providing a warning of the cross-conduction detection before occurrence of a failure of a selectively conductive device selected from a group consisting of the first selectively conductive device and the second selectively conductive device.

2. The method of claim 1, wherein the first output terminal of the first selectively conductive device is coupled to the second output terminal of the second selectively conductive device at an output node.

3. The method of claim 1, wherein the cross-conduction detection is a detection of the first selectively conductive device and the second selectively conductive device conducting at a same time.

4. The method of claim 1, wherein the obtaining the reference voltage value comprises:
charging the capacitor through the resistor coupled to a first supply voltage node, the first supply voltage node coupled to the first supply voltage terminal of the first selectively conductive device via a parasitic inductor.

5. The method of claim 1, wherein the obtaining the reference voltage value comprises:
charging the capacitor through the resistor coupled to the first supply voltage terminal of the first selectively conductive device.

6. The method of claim 1, wherein the providing the warning comprises:
triggering a mitigation measure selected from a group consisting of swapping out a cross-conducting voltage regulator (VR) module for a spare VR module, adjusting a timing of the control driver circuit, and swapping out an information handling system for a backup information handling system to prevent occurrence of a subsequent cross-conduction event.

7. A circuit comprising:
a first selectively conductive device, the first selectively conductive device having a first control terminal, a first supply voltage terminal, and a first output terminal;
a second selectively conductive device, the second selectively conductive device having a second control terminal, a second supply voltage terminal, and a second output terminal, the second output terminal coupled to the first output terminal;
a comparator, the comparator having a first comparator input coupled to receive a reference voltage value and a second comparator input coupled to the first supply voltage terminal of the first selectively conductive device, the comparator having a comparator output for providing a comparator output signal; and
a logic gate, the logic gate having a first logic gate input coupled to the comparator output and a second logic gate input coupled to the second control terminal, the logic gate having a logic gate output for providing a logic gate output signal, wherein the reference voltage value is provided by a voltage reference circuit comprising:
a resistor having a first resistor terminal and a second resistor terminal, the first resistor terminal coupled to a power supply unit (PSU) output; and
a capacitor having a first capacitor terminal and a second capacitor terminal, the first capacitor terminal coupled to the second resistor terminal and to the first comparator input, the second capacitor terminal coupled to a stable voltage source.

8. The circuit of claim 7, further comprising:
a power supply unit (PSU) having a PSU output for providing a power supply voltage; and
a parasitic inductor having a first parasitic inductor terminal coupled to the PSU output and a second parasitic inductor terminal coupled to the first supply voltage terminal of the first selectively conductive device.

9. The circuit of claim 7, wherein the first resistor terminal coupled to the first supply voltage terminal of the first selectively conductive device.

10. The circuit of claim 7, wherein the logic gate implements an AND logical function to condition detection of a momentary reduction of a local power supply voltage at the first power supply voltage terminal of the first selectively conductive device relative to the reference voltage value upon a condition that a control drive signal provided to the second control terminal is asserted.

11. The circuit of claim 7, wherein the comparator detects a momentary reduction of a local power supply voltage at the first power supply voltage terminal of the first selectively conductive device relative to the reference voltage value.

12. The circuit of claim 7, wherein the comparator detects a local power supply voltage drop during a cross-conduction event and the logic gate validates the power supply voltage drop as being caused by the cross-conduction event, the cross-conduction event occurring upon simultaneous conduction of the first selectively conductive device and the second selectively conductive device.

13. An information handling system (IHS) comprising:
a power supply unit (PSU);
a processor; and
a voltage regulator (VR) coupled to the PSU to receive a PSU output voltage at a PSU output, the VR including:
a first selectively conductive device, the first selectively conductive device having a first control terminal, a first supply voltage terminal coupled to the PSU output, and a first output terminal;
a second selectively conductive device, the second selectively conductive device having a second control terminal, a second supply voltage terminal, and a second output terminal, the second output terminal coupled to the first output terminal; and
a comparator, the comparator having a first comparator input coupled to receive a reference voltage value and a second comparator input coupled to the first supply voltage terminal of the first selectively conductive device, the comparator having a comparator output for providing a comparator output signal, the processor coupled to the VR for providing an indication of a detection of a cross-conduction event based on the comparator output signal conditioned upon a control drive signal at the second control terminal being asserted, the cross-conduction event occurring upon simultaneous conduction of the first selectively conductive device and the second selectively conductive device, wherein the reference voltage value is provided by a voltage reference circuit comprising:
a resistor having a first resistor terminal and a second resistor terminal, the first resistor terminal coupled to the PSU output; and
a capacitor having a first capacitor terminal and a second capacitor terminal, the first capacitor terminal coupled to the second resistor terminal and to the first comparator input, the second capacitor terminal coupled to a stable voltage source.

14. The IHS of claim 13, further comprising:
a parasitic inductor having a first parasitic inductor terminal coupled to the PSU output and a second parasitic inductor terminal coupled to the first supply voltage terminal of the first selectively conductive device.

15. The IHS of claim 13, wherein the first resistor terminal coupled to the first supply voltage terminal of the first selectively conductive device; and a capacitor having a first capacitor terminal and a second capacitor terminal, the first capacitor terminal coupled to the second resistor terminal and to the first comparator input, the second capacitor terminal coupled to a stable voltage source.

16. The IHS of claim 13, wherein the comparator detects a momentary reduction of a local power supply voltage at the first power supply voltage terminal of the first selectively conductive device relative to the reference voltage value.

17. The IHS of claim 13, wherein the processor triggers a mitigation measure selected from a group consisting of swapping out a cross-conducting VR module for a spare VR module, adjusting a timing of a control terminal driver, and swapping out the IHS for a backup IHS to prevent occurrence of a subsequent cross-conduction event.

* * * * *